United States Patent
Friedmann et al.

[11] Patent Number: 5,234,073
[45] Date of Patent: Aug. 10, 1993

[54] FRONT WHEEL DRIVE FOR MOTOR VEHICLES

[75] Inventors: Oswald Friedmann, Lichtenau; Norbert Indlekofer, Bühl, both of Fed. Rep. of Germany

[73] Assignee: LuK Lamellen und Kupplungsbau GmbH, Bühl, Fed. Rep. of Germany

[21] Appl. No.: 685,525

[22] Filed: Apr. 15, 1991

[30] Foreign Application Priority Data

Apr. 14, 1990 [DE] Fed. Rep. of Germany ....... 4012139

[51] Int. Cl.⁵ .................. B60K 17/00; B60K 5/00
[52] U.S. Cl. .................... 180/292; 180/366; 180/378
[58] Field of Search ............. 180/76, 292, 297, 366, 180/376, 378; 474/69; 74/200, 206, 210, 198

[56] References Cited

U.S. PATENT DOCUMENTS

| | | | |
|---|---|---|---|
| 2,878,690 | 3/1959 | Capron et al. | 180/366 X |
| 3,343,621 | 9/1967 | Van Doorne | 180/366 X |
| 3,939,732 | 2/1976 | Giacosa | 180/292 X |
| 4,205,729 | 6/1980 | Morino | 180/292 X |
| 5,021,031 | 6/1991 | Hibi | 474/18 |
| 5,046,991 | 9/1991 | Friedmann | 474/28 X |
| 5,049,112 | 9/1991 | Gunsing | 474/18 X |
| 5,509,157 | 10/1991 | Sato | 474/18 |

FOREIGN PATENT DOCUMENTS

| | | |
|---|---|---|
| 0002086 | 5/1979 | European Pat. Off. . |
| 0035806 | 9/1984 | European Pat. Off. . |
| 2064011 | 6/1981 | United Kingdom ............ 180/292 |

*Primary Examiner*—Brian Johnson
*Attorney, Agent, or Firm*—Peter K. Kontler

[57] ABSTRACT

A front wheel drive for use in motor vehicles has an engine which extends transversely of the direction of forward movement of the vehicle. The output element of the engine drives the input component of a continuously variable chain or belt transmission with adjustable sheaves which drives a differential with two coaxial output components serving to drive the front wheels. The axis of rotation of the output element of the engine is normal to the axes of rotation of primary and secondary cones of the infinitely variable gearing, and to the axes of rotation of the output components of the differential. The axes of rotation of the output components are parallel to axes of rotation of the primary and secondary cones.

17 Claims, 2 Drawing Sheets

FRONT WHEEL DRIVE FOR MOTOR VEHICLES

BACKGROUND OF THE INVENTION

The invention relates to wheel drives for motor vehicles, and more particularly to improvements in front wheel drives for automobiles and analogous conveyances. Still more particularly, the invention relates to improvements in front wheel drives of the type wherein the output element of the engine drives a continuously variable speed transmission hereinafter called gearing or infinitely variable gearing) which, in turn, drives the front wheels by way of a differential.

A front wheel drive of the above outlined character is disclosed in European Pat. No. 0 035 806. The engine extends transversely of the direction of forward movement of the vehicle, i.e., the engine is substantially parallel with the axle for the rear wheels. The axes of the rotary input and output members of the infinitely variable gearing (which is an endless belt transmission) are parallel to the axis of the output element of the engine. The effective diameters of the input and output members are variable to thereby change the ratio of the endless belt transmission. The secondary member of the belt transmission is coaxial with the differential. The just described front wheel drive is advantageous in many types of motor vehicles, especially in relatively small vehicles. The reason is that the engine for use in a relatively small vehicle is sufficiently short so that it can be installed transversely of the direction of forward movement. However, such front wheel drives cannot be used in full-sized motor vehicles because the engine is too long and/or because the space requirements of the transmission which is to be used with a transversely mounted engine are excessive.

OBJECTS OF THE INVENTION

An object of the invention is to provide a front wheel drive which can be used with equal advantage in relatively small, in medium sized and in large motor vehicles.

Another object of the invention is to provide a front wheel drive which is at least as simple as heretofore known front wheel drives and which can be installed in a motor vehicle in a novel and improved way.

A further object of the invention is to provide a front wheel drive whose space requirements beneath the hood of a motor vehicle are not greater than those of heretofore known front wheel drives.

An additional object of the invention is to provide a front wheel drive which can be installed in a motor vehicle in a time-saving manner, wherein all parts which require frequent inspection and/or maintenance are readily accessible, and which can be used in existing makes of motor vehicles.

Still another object of the invention is to provide a highly efficient front wheel drive.

SUMMARY OF THE INVENTION

The invention is embodied in a front wheel drive for a motor vehicle, such as a passenger car, which has a rear axle. The improved front wheel drive comprises an internal combustion engine having a rotary output element (such as a crankshaft) which extends substantially transversely of the rear axle, and a transmission which is preferably affixed to the engine and comprises an infinitely variable gearing having a primary rotary member and a secondary rotary member. The primary member is driven by the output element of the engine and the secondary member is driven by the primary member, e.g., by way of a V-belt. The transmission further comprises a differential with two preferably coaxial output components, one for each front wheel, and a gear train which connects the secondary member with the differential. The axis of rotation of the output element of the engine is at least substantially normal to the axes of the input and output members of the infinitely variable gearing as well as to the axes of rotation of the output components of the differential, and the axes of rotation of the primary and secondary members of the infinitely variable gearing are at least substantially parallel to the axes of rotation of the output components of the differential.

The output components of the differential are preferably disposed between the engine and the secondary member of the infinitely variable gearing (as seen in the axial direction of the output element of the engine).

A straight line which is normal to and connects the common axis of the output components of the differential with the axis of the primary member of the infinitely variable gearing and a straight line which is normal to and connects the common axis of the output components with the axis of the secondary member of the infinitely variable gearing preferably make an angle of between 60° and 95°, most preferably an angle of approximately 75°.

The output components of the differential can be disposed between the engine and the primary member of the infinitely variable gearing (as seen in the axial direction of the output element of the engine).

In accordance with a presently preferred embodiment of the improved front wheel drive, the output components of the differential are coaxial with the output member of the infinitely variable gearing.

The infinitely variable gearing can include a continuously variable transmission with two adjustable conical sheaves and a V-belt or a chain which is trained over the sheaves.

The novel features which are considered as characteristic of the invention are set forth in particular in the appended claims. The improved front wheel drive itself, however, both as to its construction and the mode of installing the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
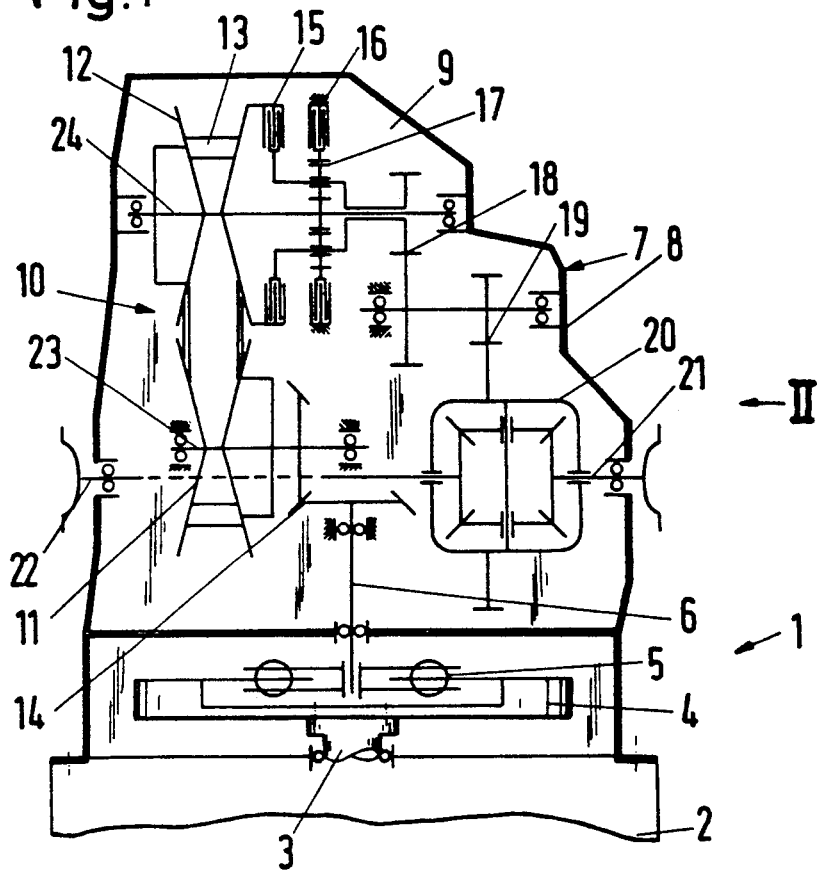
FIG. 1 is a schematic plan view of a portion of a front wheel drive which embodies one form of the invention.
Figure 2:
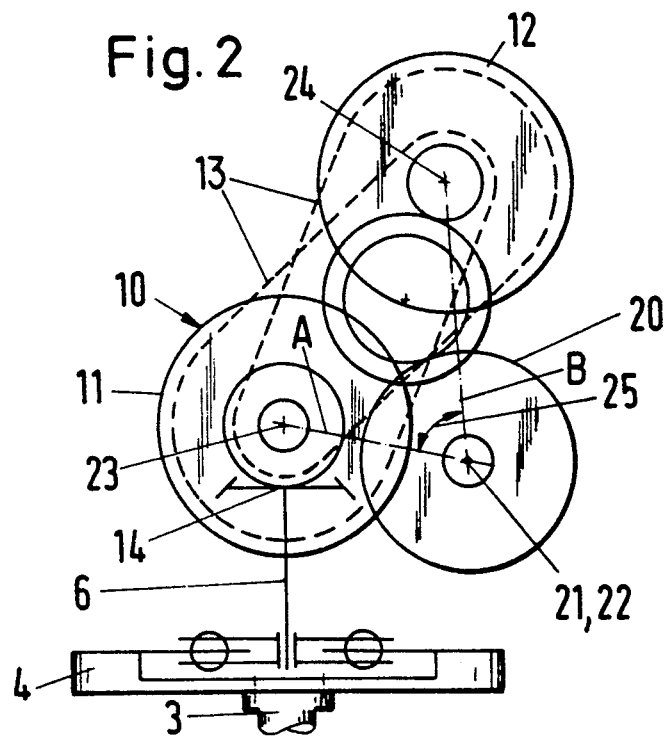
FIG. 2 is a view of a detail of the transmission as seen in the direction of arrow II in FIG. 1.

The front wheel drive 1 which is shown in FIGS. 1 and 2 comprises an internal combustion engine 2 having a rotary output element (such as a crankshaft) 3 which extends in the direction of forward movement of the motor vehicle, the same as the engine 2. Thus, the output element 3 is normal to the axle (not shown) for the rear wheels (not shown) of the motor vehicle.

The output element 3 carries a flywheel 4 which is connected with the input shaft 6 of a transmission 7 by way of a damper 5. The transmission 7 comprises a gear case 8 which is preferably mounted directly on the engine 2. The internal space 9 of the gear case 8 confines an infinitely variable gearing 10, as well as various gears, clutches and certain other units. In addition, the gear case 8 contains a differential 20 with two coaxial output components 21, 22 for the two front wheels of the motor vehicle. Still further, that portion of the gear case 8 which is adjacent the engine 2 confines the damper 5 and the flywheel 4.

The infinitely variable gearing 10 in the internal space 9 of the gear case 8 comprises an adjustable rotary primary sheave 11 (hereinafter called primary member) which is driven by the output element 3 of the engine 2, and an adjustable rotary secondary sheave 12 (hereinafter called secondary member) which is driven by the primary member 11 by way of an endless V-belt 13. This belt can be replaced with an endless chain without departing from the spirit of the invention. The primary member 11 receives torque from the engine 2 by way of the output element 3 of the engine and the input shaft 6 of the transmission 7. A bevel gear transmission 14 is interposed between the input shaft 6 and the primary member 11 of the gearing 10.

The secondary member 12 is connected with the input element of the differential 20 by a spur gear train transmission 17, 18, 19 and starter clutches 15, 16 which can be operated in such a way that the clutch 15 is closed when the clutch 16 is open and vice versa. The output components 21, 22 of the differential 20 are connected with the respective front wheels (not shown) by means of cardan shafts or in any other well known manner.

The clutch 15 is a starter clutch for forward driving, and the clutch 16 is a starter clutch for driving in reverse. As mentioned above, the clutch 15 is idle when the clutch 16 is engaged, and the other way around.

FIG. 2 shows the two extreme positions of the endless V-belt or chain 13 by broken lines. The belt or chain 13 assumes such positions when the ratio of the transmission reaches the maximum and minimum values.

The orientation of the engine 2 relative to various units in the gear case 8 of the transmission 7 is such that the axis of rotation of the output element 3 of the engine is at least substantially normal to the axes of rotation of the primary and secondary members 11, 12. The axes for the primary and secondary members 11, 12 of the gearing 10 are respectively defined by the shafts 23, 24 which form part of the gearing 10. Furthermore, the axes of the shafts 23, 24 (i.e., of the primary and secondary members 11, 12) are parallel to the axes of the output components 21, 22 of the differential 20.

The differential 20 is disposed between the engine 2 and the secondary member 12 of the gearing 10, as seen in the axial direction of the output element 3. Furthermore, the differential 20 is installed with at least a portion at a level beneath the primary component 11 which is located between the engine 2 and the secondary component 12. The axes of the shafts 23, 24 and of the output components 21, 22 are arranged in such a way that the angle 25 between a straight line A which is normal to the axes of the components 21, 22 and connects these axes with the axis of the shaft 23, and a straight line B which is normal to the axes of the components 21, 22 and connects these axes with the axis of the shaft 24 is a relatively large acute angle or a relatively small obtuse angle, preferably an angle of between 60° and 95°, most preferably an angle of approximately 75°.

The front wheel drive 1 of FIGS. 1 and 2 can be installed in a motor vehicle in such a way that the engine 2 is located in front of or behind the transmission 7 (as seen in the direction of forward movement of the vehicle). Thus, the transmission 7 or the engine 2 can be nearer to the passenger compartment. The selection will be made in dependency upon certain parameters, e.g., the availability of space beneath the hood.

An important advantage of the improved front wheel drive 1 is its compactness. This is attributable to the aforedescribed orientation of various axes relative to each other and to the installation of the engine 2 in such a way that the axis of its output element 3 extends in the direction of forward movement of the motor vehicle, i.e., substantially at right angles to the axle for the rear wheels of the vehicle. Another important advantage of the front wheel drive 1 is that its height is surprisingly small, not only in the region of the gearing 10 but also in the region of the differential 20. The reduction of height can be promoted by installing the primary and secondary members 11, 12 of the gearing 10 one behind the other, as seen in the direction of forward movement of the vehicle (i.e., as seen in the axial direction of the output element 3 of the engine 2). This renders it possible to place the axes of the shafts 23, 24 for the members 11, 12 into or close to a horizontal plane with attendant considerable reduction of the height of the gearing 10. The relatively flat gearing 10 renders it possible to install the differential 20 and its output components 21, 22 at a level below the primary member 11 which is driven by the engine 2 via input shaft 6 of the transmission 7.

The aforediscussed compactness of the front wheel drive 1 and of its transmission 7, including the width and the height of that part of the transmission which is located at a maximum distance from the engine 2, renders it possible to install the front wheel drive beneath the hood in such a way that the aforementioned part of the transmission can require a relatively small recess in the bottom region of the chassis of the motor vehicle.

The positioning of the output components 21, 22 of the differential 20 between the engine 2 and the secondary member 12 (as seen in the axial direction of the output element 3) and the positioning of the differential 20, at least approximately beneath the primary member 11, also contribute to a reduction of space requirements of the front wheel drive.

Figure 3:
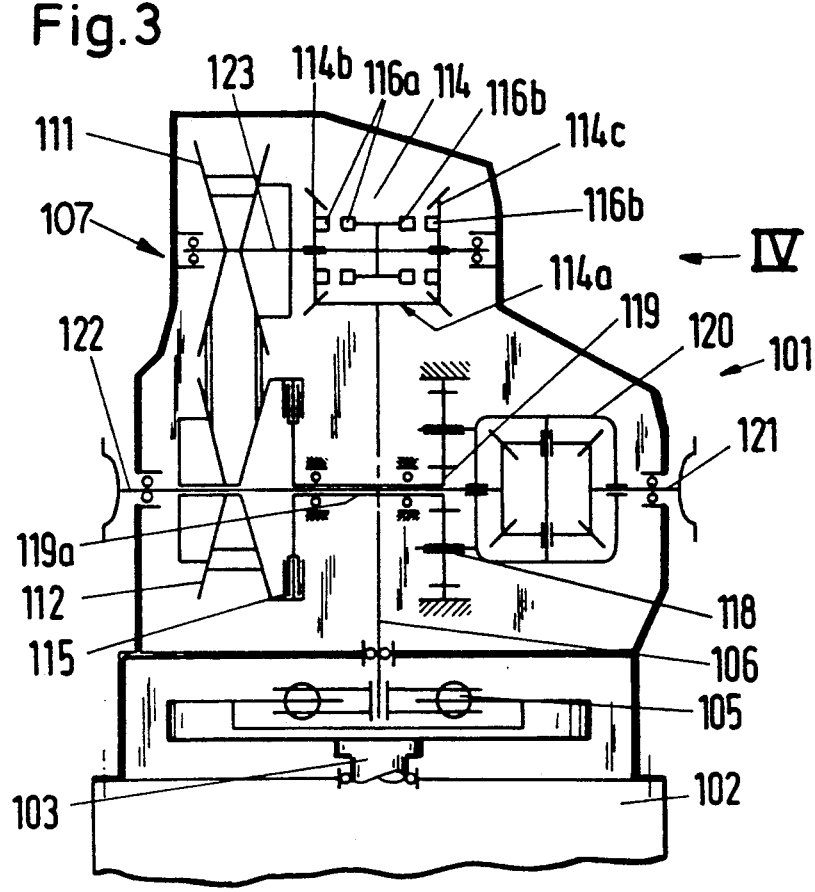
FIG. 3 is a fragmentary plan view of a modified front wheel drive.
Figure 4:
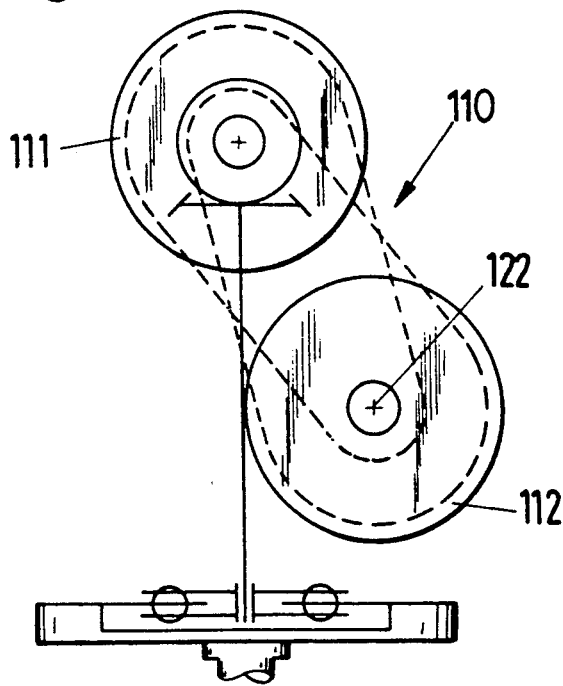
FIG. 4 is a view of a detail of the transmission as seen in the direction of arrow IV in FIG. 3.

FIGS. 3 and 4 show certain details of a second front wheel drive 101. All such constituents of the front wheel drive 101 which are identical with or clearly analogous to corresponding parts of the front wheel drive 1 are denoted by similar reference characters plus 100. The secondary member 112 of the infinitely variable gearing 110 is disposed substantially between the primary member 111 and the engine 102. Thus, the primary member 111 is more distant from the engine 102 than the secondary member 112. A bevel gear transmission 114 is provided between the input element 106 of the transmission 107 and the primary member 111 of the gearing 110. The input element 106 is driven by the output element 103 of the engine 102 by way of the rotary vibration damper 105. As can be seen in FIG. 4, the primary member 111 is installed at a level above the shaft 122 for the secondary member 112.

The bevel gear transmission 114 comprises an input element 114a which is driven by the input element 106 of the transmission 107, and two output elements 114b, 114c which are rotatably mounted on the shaft 123 for the primary member 111 and can be selectively driven by this shaft in response to engagement of claw clutches 116a, 116b, respectively. The output element 114b is driven when the vehicle is to move in a forward direction and the output element 114c is driven when the vehicle is to be moved in reverse. A conventional bevel gear transmission which can be used in the front wheel drive 101 of FIGS. 3 and 4 is described and shown in published European patent application No. 00 02 086.

The differential 120 receives torque from the secondary member 112 of the infinitely variable gearing 110 through the medium of a planetary gearing 118 and a starter clutch 115. The input gear 119 of the planetary gearing 118 is connected with the output element of the clutch 115 by a hollow shaft 119a. The output components 121, 122 of the differential 120 are coaxial with the secondary member 112 and with the hollow shaft 119a. The output component 122 extends axially through the hollow shaft 119a and serves to rotatably mount the secondary member 112. The shaft 123 and the output components 121, 122 are arranged in such a way that they are parallel to each other and make an angle of at least approximately 90° with the axis of the output element 103 of the engine 102.

An advantage of the front wheel drive 101 is that the output components 121, 122 of the differential 120 are coaxial with the shaft for the secondary member 112 of the infinitely variable gearing 110. The positioning of the output components 121, 122 between the engine 102 and the primary member 111 of the gearing 110 (as seen in the axial direction of the output element 103 of the engine) contributes to compactness of the front wheel drive 101. The secondary member 112 can be mounted directly on the output component 122 so that one of the shafts 23, 24 shown in FIG. 1 can be dispensed with.

The improved front wheel drive is susceptible of many additional modifications without departing from the spirit of the invention. For example, various parts of the drive 1 can be combined with various parts of the drive 101 in a number of different ways.

An infinitely variable gearing with adjustable sheaves is disclosed, for example, in commonly owned U.S. Pat. No. 5,046,991 granted Sep. 10, 1991 to Oswald Friedmann.

Without further analysis, the foregoing will so fully reveal the gist of the present invention that others can, by applying current knowledge, readily adapt it for various application without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A front wheel drive for a motor vehicle having a rear axle, comprising an engine having a rotary output element extending transversely of the rear axle; and a transmission having a case affixed to said engine, said transmission comprising an infinitely variable gearing disposed in said case and having a primary rotary member driven by said output element and a secondary rotary member driven by said primary member, a differential with two rotary output components, and a gear train disposed in said case and connecting said secondary member with said differential, the axis of rotation of said output element being at least substantially normal to the axes of said primary and secondary members and to the axes of rotation of said output components, the axes of rotation of said primary and secondary members being at least substantially parallel to the axes of rotation of said output components.

2. The front wheel drive of claim 1, wherein said output element is a crankshaft.

3. The front wheel drive of claim 1, wherein said output components have a common axis.

4. The front wheel drive of claim 3, wherein a straight line which is normal to and connects the common axis of said output components with the axis of said primary member and a straight line which is normal to and connects said common axis with the axis of said secondary member make an angle of between 60° and 95°.

5. The front wheel drive of claim 4, wherein said angle is approximately 75°.

6. The front wheel drive of claim 1, wherein said output components are disposed between said engine and said primary member, as seen in the axial direction of said output element.

7. The front wheel drive of claim 1, wherein said output components are coaxial with said output member.

8. The front wheel drive of claim 1, wherein said infinitely variable gearing includes a belt or chain transmission.

9. The front wheel drive of claim 1, wherein said gear train comprises spur gears.

10. The front wheel drive of claim 1, wherein said gear train comprises bevel gears.

11. The front wheel drive of claim 1, further comprising at least one starter clutch driven by said secondary rotary member and operable to transmit torque to said differential.

12. The said wheel drive of claim 1, wherein gear train comprises a planetary gearing.

13. A front wheel drive for a motor vehicle having a rear axle, comprising an engine having a rotary output element extending transversely of the rear axle; and a transmission affixed to said engine and comprising an infinitely variable gearing having a primary rotary member driven by said output element and a secondary rotary member driven by said primary member, a differential with two rotary output components disposed between said engine and said secondary member, as seen in the axial direction of said output element, and a gear train connecting said secondary member with said differential, the axis of rotation of said output element being at least substantially normal to the axes of rotation of said primary and secondary members and to the axes of rotation of said output components, the axes of rotation of said primary and secondary members being at least substantially parallel to the axes of rotation of said output components.

14. A front wheel drive for a motor vehicle having a rear axle, comprising an engine having a rotary output element extending transversely of the rear axle; and a transmission affixed to said engine and comprising an infinitely variable gearing having a primary rotary member driven by said output element and a secondary rotary member driven by said primary member, a differential with two rotary output components, and a gear train connecting said secondary member with said differential, the axis of rotation of said output element being at least substantially normal to the axes of rotation of said primary and secondary members and to the axes of rotation of said output components, the axes of rotation of said primary and secondary members being at least substantially parallel to the axes of rotation of said output components and being more distant from said engine than the axes of rotation of said output components, as seen in the axial direction of said output element.

15. A front wheel drive for a motor vehicle having a rear axle, comprising an engine having a rotary output element extending transversely of the rear axle; and a transmission having a case affixed to said engine and comprising an infinitely variable gearing disposed in said case and having a primary rotary member driven by said output element and a secondary rotary member driven by said primary member, a differential with two rotary output components, and a gear train disposed in said case and connecting said secondary member with said differential, the axis of rotation of said output element being at least substantially normal to the axes of rotation of said primary and secondary members and to the axes of rotation of said output components, the axes of rotation of said primary and secondary members being at least substantially parallel to the axes of rotation of said output components, the axis of rotation of one of said primary and secondary members being more distant from said engine than the axes of rotation of said output components, as seen in the axial direction of said output element, and the axis of rotation of the other of said primary and secondary members being located approximately at or close to the same distance from said engine as the axes of said output components, as seen in the axial direction of said output element.

16. A front wheel drive for a motor vehicle having a rear axle, comprising an engine having a rotary output element extending transversely of the rear axle; and a transmission affixed to said engine and comprising an infinitely variable gearing having a primary rotary member driven by said output element and a secondary rotary member driven by said primary member, a differential with two rotary output components, and a gear train connecting said secondary member with said differential, the axis of rotation of said output element being at least substantially normal to the axes of rotation of said primary and secondary members and to the axes of rotation of said output components, the axes of rotation of said primary and secondary members being at least substantially parallel to the axes of rotation of said output components, the axes of rotation of said primary and secondary components being spaced apart from each other in the axial direction of said output element and the axes of rotation of said output components being nearer to said engine than the axes of rotation of said primary and secondary members.

17. A front wheel drive for a motor vehicle having a rear axle, comprising an engine having a rotary output element extending transversely of the rear axle; and a transmission affixed to said engine and comprising an infinitely variable gearing having a primary rotary member driven by said output element and a secondary rotary member driven by said primary member, a differential with two rotary output components, and a gear train connecting said secondary member with said differential, the axis of rotation of said output element being at least substantially normal to the axes of rotation of said primary and secondary members and to the axes of rotation of said output components, the axes of rotation of said primary and secondary members being at least substantially parallel to the axes of rotation of said output components and said engine being located ahead of said transmission, as seen in the direction of forward movement of the motor vehicle.

* * * * *